(12) United States Patent  
Cash

(10) Patent No.: US 8,939,839 B2  
(45) Date of Patent: Jan. 27, 2015

(54) INTERACTIVE VEHICLE GAMING SYSTEM AND METHOD

(71) Applicant: Honda Motor Co., Ltd., Tokyo (JP)

(72) Inventor: Duane Matthew Cash, Mountainview, CA (US)

(73) Assignee: Honda Motor Co., Ltd., Tokyo (JP)

( * ) Notice: Subject to any disclaimer, the term of this patent is extended or adjusted under 35 U.S.C. 154(b) by 48 days.

(21) Appl. No.: 13/830,039

(22) Filed: Mar. 14, 2013

(65) Prior Publication Data

US 2014/0274400 A1 Sep. 18, 2014

(51) Int. Cl.
| A63F 9/24 | (2006.01) |
| A63F 13/00 | (2014.01) |
| G06F 17/00 | (2006.01) |
| G06F 19/00 | (2011.01) |
| H04L 29/06 | (2006.01) |

(52) U.S. Cl.
CPC .............................. *H04L 29/06034* (2013.01)
USPC ............................................ 463/40; 463/42

(58) Field of Classification Search
USPC .......................................................... 463/40
See application file for complete search history.

(56) References Cited

U.S. PATENT DOCUMENTS 6,241,612 B1 * 6/2001 Heredia ........................... 463/42
6,639,614 B1 10/2003 Kosslyn et al.
8,009,026 B2 8/2011 Giuli
2004/0110565 A1 * 6/2004 Levesque ........................ 463/42
2011/0124389 A1 5/2011 Lee
2012/0001744 A1 1/2012 Giuli

FOREIGN PATENT DOCUMENTS

KR 20080005791 1/2008

OTHER PUBLICATIONS

Mario Kart DS, Nintendo, Nov. 14, 2005, instruction manual.*
Mario Kart Wii, Nintendo, Apr. 27, 2008, instruction manual.*
Mario Kart Arcade GP, Oct. 2005, image of arcade cabinets.*
http://www.spireon.com/changing-the-game-and-driver-behavior; Changing the Game—And Driver Behavior; Daris Schantz.
ACM 978-1-4503-0268-5/11/05; Driving the Scoreboard: Motivating Eco-Driving Through In-Car Gaming; Ohad Inbar; CHI 2011, May 7-12, 2011.
NTNU Norwegian University of Science and Technology; Pervasive Games for Vehicle Drivers; Amr Ellafy; Jul. 2011.

* cited by examiner

*Primary Examiner* — Kevin Y Kim
(74) *Attorney, Agent, or Firm* — Rankin, Hill & Clark LLP

(57) ABSTRACT

A computer implemented interactive vehicle gaming system and method includes a first interactive game device connected to a second interactive game device for communication therebetween. At least one game parameter is determined for the first and second game devices associated with driving behavior for at least one vehicle. User input is received on the first game device to initiate a virtual shot against the second game device. After receiving the user input, a shot game result is determined for the virtual shot based on the at least one game parameter. Then, at least one indication of the shot result is provided for at least one of first and second game devices.

19 Claims, 3 Drawing Sheets

INTERACTIVE VEHICLE GAMING SYSTEM AND METHOD

BACKGROUND

In recent years, there has been an emphasis by vehicle manufactures to take advantage of the features offered in so-called smart phones that many vehicle drivers have with them when operating vehicles. In particular, smart phones are often equipped with built-in sensors, peripheral devices, etc., including accelerometers, global positioning systems (GPSs), cameras, interactive touch screen displays, etc. Separate from these smart phones, vehicle manufacturers have also spent increasing amounts of time and money on increasing fuel efficiency for their vehicles. One variable that is difficult to control is driver behavior. In particular, when a driver drives his or her vehicle in a fuel efficient manner, huge fuel efficiency gains can be realized; in contrast, when a driver does not conform to fuel efficient driving behavior, the fuel efficiency of the vehicle will suffer regardless of what controls and/or technologies are put on the vehicle for improving the fuel efficiency of the vehicle.

SUMMARY

According to one aspect, a computer implemented interactive vehicle gaming method includes connecting first and second interactive game devices for communication therebetween, determining at least one game parameter for the first and second game devices associated with driving behavior for at least one vehicle, and receiving user input on the first game device to initiate a virtual shot against the second game device. After receiving the user input, a shot game result is determined for the virtual shot based on the at least one game parameter. Then, at least one indication of the shot result is provided for at least one of first and second game devices.

According to another aspect, an interactive vehicle gaming system includes a first interactive game device connected to a second interactive game device for communication therebetween. The first game device includes a processor and a memory coupled to the processor and operable for storing instructions, which, when executed by the processor, causes the processor to perform operations including: determining at least one game parameter for the first and second game devices associated with driving behavior for at least one vehicle, determining a shot result for a virtual shot based on the at least one game parameter after receiving user input on the first game device to initiate the virtual shot against the second game device, and providing at least one indication of the shot result for at least one of the first and second game devices.

DETAILED DESCRIPTION

Figure 1:
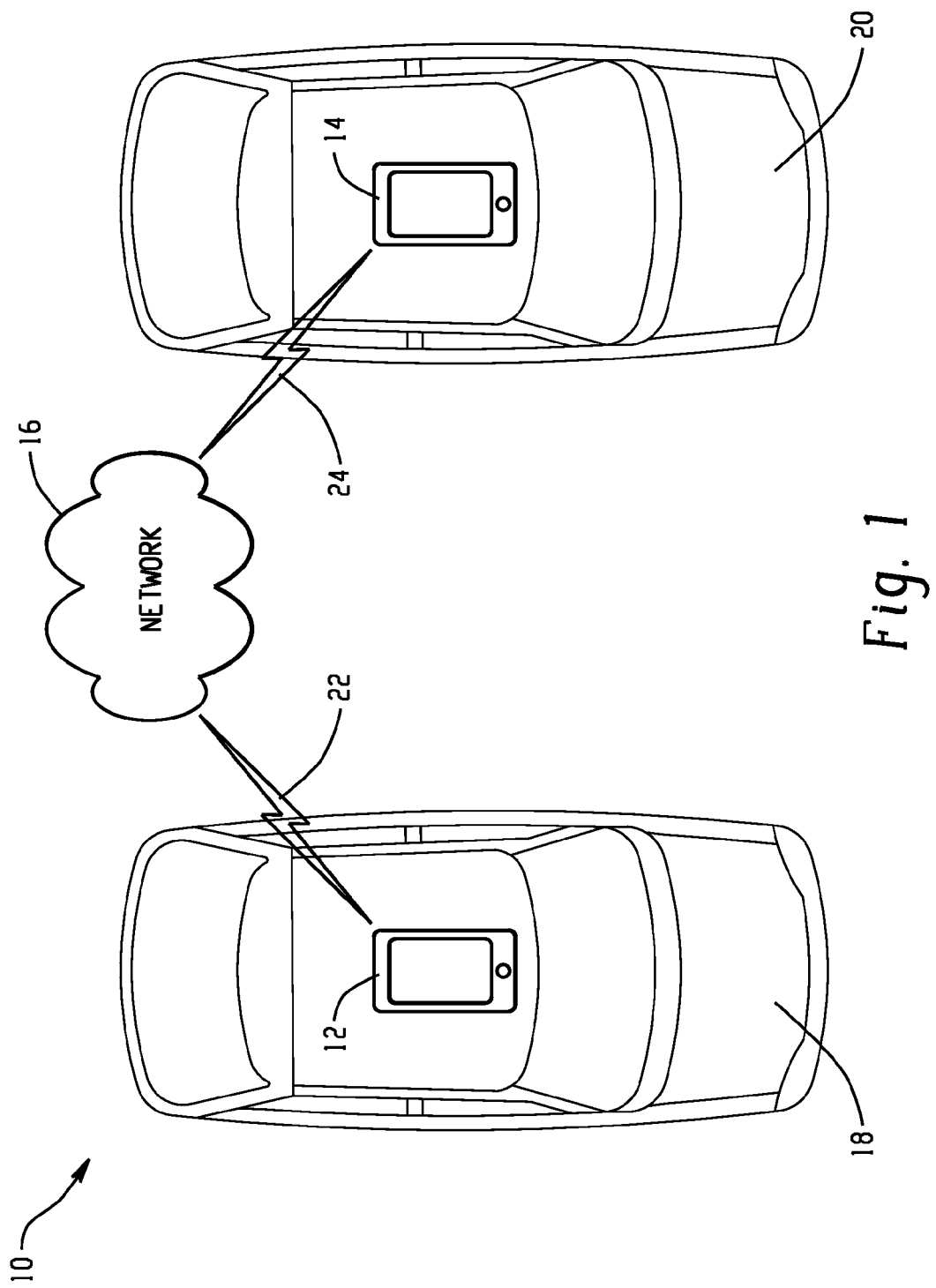
FIG. 1 schematically illustrates an interactive vehicle gaming system according to an exemplary embodiment where the system includes first and second interactive game devices, respectively, carried in first and second vehicles.

The following includes definitions of selected terms employed herein. The definitions include various examples and/or forms of components that fall within the scope of a term and that can be used for implementation. The examples are not intended to be limiting.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "machine-readable medium", as used herein, refers to a medium that provides signals, instructions and/or data. A machine-readable medium can take forms, including, but not limited to, non-volatile media and volatile media. Non-volatile media can include, for example, optical or magnetic disks, and so on. Volatile media can include, for example, semiconductor memories, dynamic memory, and so on. Common forms of a machine-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device can read.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

Referring now to the drawings wherein the showing are for purposes of illustrating one or more exemplary embodiments and not for purposes of limiting same, FIG. 1 schematically illustrates an interactive vehicle gaming system generally designated by reference numeral 10. As shown, the system 10 can include a first interactive game device 12 connected for bi-directional computer communication to a second interactive game device 14 via a network 16 for communication therebetween. The game devices 12, 14 can each be any suitable portable device (e.g., mobile smart phone) that includes communication technology (e.g., wireless technology) for sharing information with other game devices and further includes the software and/or hardware necessary to operate as described hereinbelow. The game devices 12, 14 can include a variety of integrated sensors or can be coupled to sensors through one or more ports of the game device (e.g., USB port). Some example sensors include but are not limited to: accelerometers, gyros, geo positioning technology (e.g., GPS, cell tower triangulation, Wi-Fi, etc.), a magnetic compass and any other technology that can used to determine position and/or orientation of a game device. In an exemplary embodiment, each game device 12 and 14 is a smart phone, such as an Apple iPhone™ operating an iOS 6 operating system, though this is not required. One having ordinary skill in the art will appreciate that the components of environment 100, as well as the components of other systems and software architectures discussed herein, can be combined, omitted or organized into different architectures for various embodiments.

As schematically illustrated in FIG. 1, the game device 12 can be carried within the schematically illustrated first vehicle 18 and likewise the game device 14 can be carried within the schematically illustrated second vehicle 20. Optionally one or both of the game devices 12, 14 can be respectively coupled to the vehicles 18, 20 (e.g., for receiving power therefrom, communicating with the vehicle, etc.), though this is not required. As will be discussed in more detail below, the game devices 12, 14 simply being carried within the respective vehicles 18, 20 provides the necessary input to the devices 12, 14 via device sensors contained within or associated with the devices 12, 14. More specifically, the game device 12, 14 can be operably connected for computer communication, respectively, via communication links 22, 24. The communication links 12, 14 can establish computer communication between the game devices 12, 14 using wireless communication. For example, wireless communication can be provided using near field communication (NFC), Bluetooth, WiFi, ZigBee, cellular communication (e.g., Code Division Multiple Access (CDMA), Global System for Mobile Communications (GSM), Long Term Evolution (LTE)) or other wireless protocols known in the art.

The first and second game devices 12, 14 can each include a processor (e.g., processor 504 in FIG. 2) and a memory (e.g., memory 550 in FIG. 2) coupled to the processor and operable for storing instructions which, when executed by the processor, can cause the processor to perform operations. As will be described in more detail below, such operations can include determining at least one game parameter for the first and second game devices 12, 14 associated with driving behavior for at least one vehicle (e.g., vehicles 18 and/or 20), determining a shot result for a virtual shot based on the at least one game parameter after receiving user input on the first game device 12 to initiate the virtual shot against the second game device 14, and providing at least one indication of the shot result for at least one of the first and second game devices.

Figure 2:
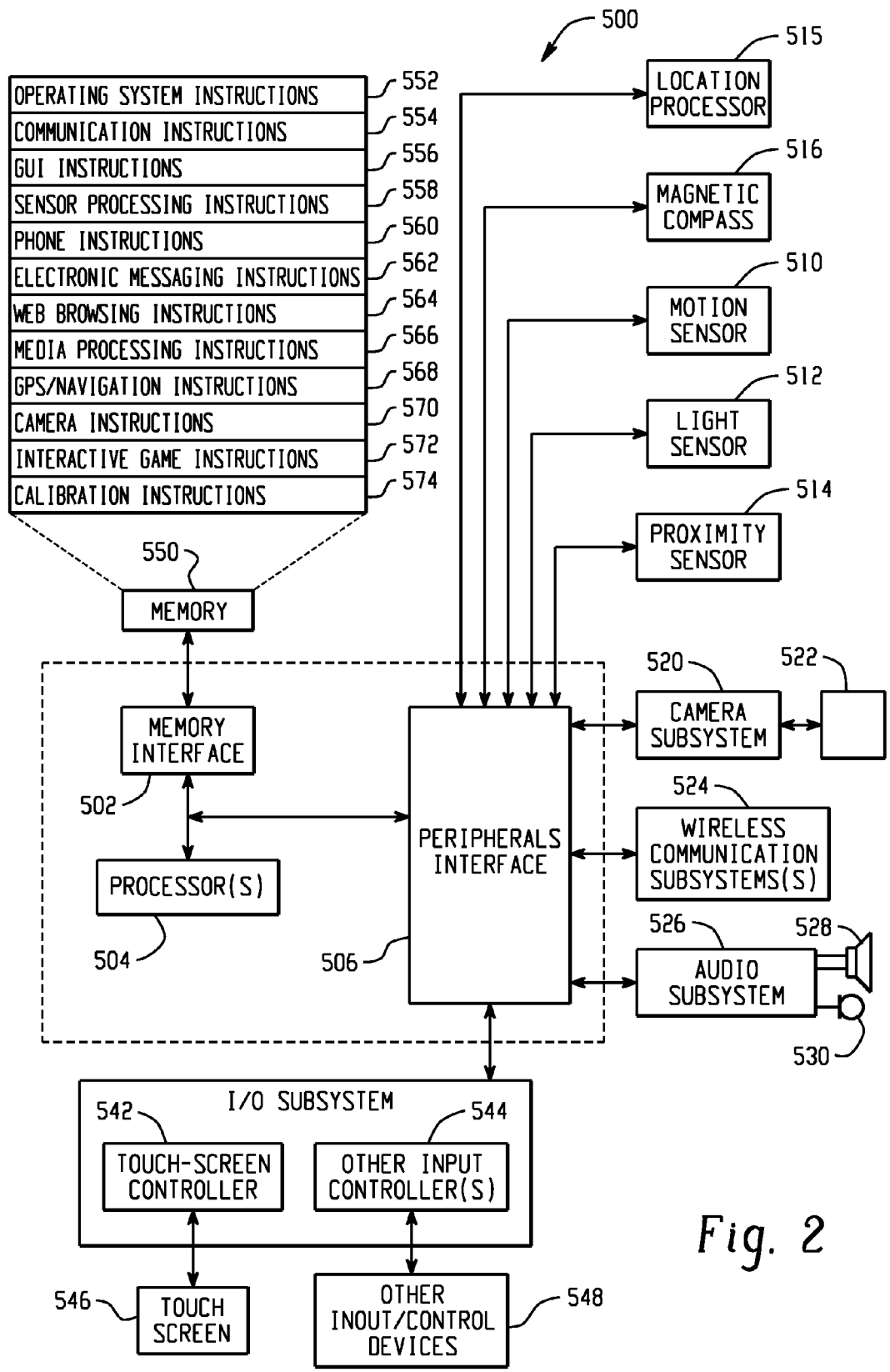
FIG. 2 illustrates schematically illustrates exemplary system architecture for the first interactive game device according to one exemplary embodiment.

FIG. 2 schematically illustrates exemplary system architecture 500 for an interactive game device, such as the game device 12 and/or the game device 14. As shown, the system architecture 500 includes a memory interface 502, one or more data processors, image processors and/or central processing units, collectively, processors 504, and a peripheral interface 506. The memory interface 502, the one or more processors 504 and/or the peripherals interface 506 can be separate components or can be integrated in one or more integrated circuits. Various components within the system architecture 500 can be coupled together by one or more communication buses or signal lines.

Sensors, devices, and subsystems can be coupled to the peripherals interface 506 to facilitate multiple functionalities. For example, a motion sensor 510, a light sensor 512, and a proximity sensor 514 can be coupled to the peripherals interface 506 to facilitate operation of the instructions referenced above. A location processor 515 (e.g., GPS receiver) can be connected to the peripherals interface 506 to provide geo positioning. A magnetic compass integrated circuit 516 can also be connected to the peripherals interface 506 to provide orientation (e.g., to determine the direction of due north). A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 524, which can include radiofrequency receivers and transmitters and/or optical (e.g., infrared) receivers and transmitters. The specific design and implementation of the communication subsystem 524 can depend on the communication network(s) over which the game devices 12, 14 are intended to operate. For example, the game devices 12, 14 can include communication subsystems 524 designed to operate over a GSM network, a GPRS network, an EDGE network, a Wi-Fi or WiMAX network, a Bluetooth™ network. In particular, the wireless communication subsystems 524 may include hosting protocol such that the devices 12, 14 may each be configured as a base station for other wireless devices.

An audio subsystems 526 can be coupled to a speaker 528 and a microphone 530 to facilitate voice enabled functions, such as voice recognition, voice replication, digital recording, and telephone functions.

The I/O subsystem 540 can include a touch-screen controller 542 and/or other input controller(s) the 544. The touch-screen controller 542 can be coupled to a touch screen 546. The touch screen 546 and touch-screen controller 542 can, for example, detect contact in movement or break thereof using any of a plurality of touch sensitive technologies, including but not limited to capacitive, resistive, infrared and surface acoustic wave technologies, as well as other proximity sensor arrays or other elements for determining one or more points of contact with the touch system 546.

The other input controller(s) 544 can be coupled to other input/control devices 548, such as one or more buttons, rocker switches, thumb-wheel, infrared port, USB port and/or a pointer device such as a stylus. The one or more buttons (not shown) can include an up/down button for volume control of the speaker 528 and/or the microphone 530.

In one implementation, a pressing of a button for a first duration may disengage a lock of the touch screen 546; and a pressing of the button for a second duration that is longer than the first duration may turn power to the game device 12 or 14 on or off. The user may be able to customize the functionality of one or more of the buttons. The touch screen 546 can, for example, also be used to implement virtual or soft buttons and/or a keyboard.

In some implementations, the game devices 12, 14 can present recorded audio and/or video files, such has MP3, AAC, and MPEG files. In some implementations, the game devices 12, 14 can include the functionality of an MP3 player, such as an iPod Touch™.

The memory interface 502 can be coupled to the memory 550. The memory 550 can include high-speed random access memory and/or non-volatile memory, such as one or more magnetic disc storage devices, one or more optical storage devices, and/or flash memory (e.g., NAND, NOR). The memory 500 can store an operating system 552, such as Darwin, RTXC, LINUX, UNIX, OSX, WINDOWS, such as imbedded operating systems such as VxWorks. The operating system 552 may include instructions for handling basic system services and for performing hardware dependent tasks. In some implementations, the operating system 552 can be a kernel (e.g., UNIX kernel).

The memory 550 may also store communication instructions 554 to facilitate communicating with one or more additional devices, one or more computers and/or one or more servers. The memory 550 may include graphical user interface instructions 556 to facilitate graphic user interface processing; sensor processing instructions 558 to facilitate sensor-related processes and functions; phone instructions 560 to facilitate phone-related processes and functions; electric message instructions 562 to facilitate electronic-messaging related processes and functions; web browsing instructions 564 to facilitate web browsing-related processes and functions; media processing instructions 566 to facilitate media processing-related processes and functions; GPS/navigation instructions 568 to facilitate GPS/navigation-related processes and functions; camera instructions 570 to facilitate camera-related processes and functions; and interactive game instructions 572 to facilitate interactive gaming. In some implementations, the GUI instructions 556 and/or the media processing instructions 566 implement the features and operations that will be described herein below in connection FIGS. 3 and 4.

The memory 550 may also store other software instructions (not shown), such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively. An activation record and international mobile equipment identify (IMEI) or similar hardware identifier can also be stored in the memory 550.

Each of the above identified instructions and applications can correspond to a set of instructions for performing one or more functions as described above. These instructions need not be implemented as separate software programs, procedures, or modules. The memory 550 can include additional instructions or fewer instructions. Furthermore, various functions of the interactive game device 100 may be implemented in hardware and/or in software, including in one or more single processing and/or applications specific integrated circuits.

Figure 3:
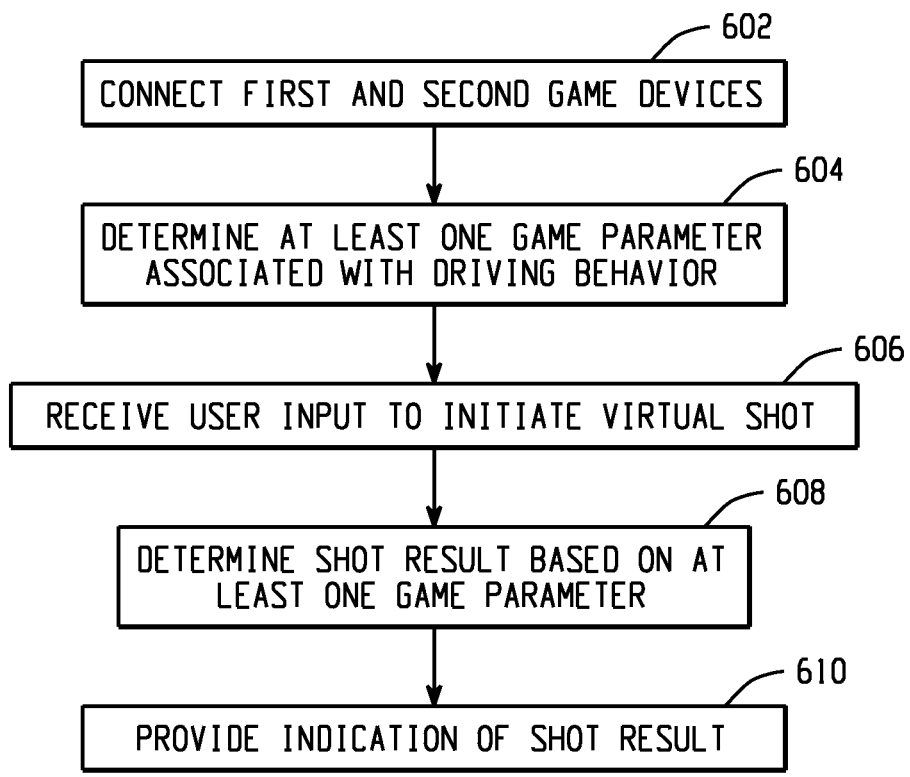
FIG. 3 is a process flow diagram of a computer implemented interactive vehicle gaming method according to one exemplary embodiment.
Figure 4:
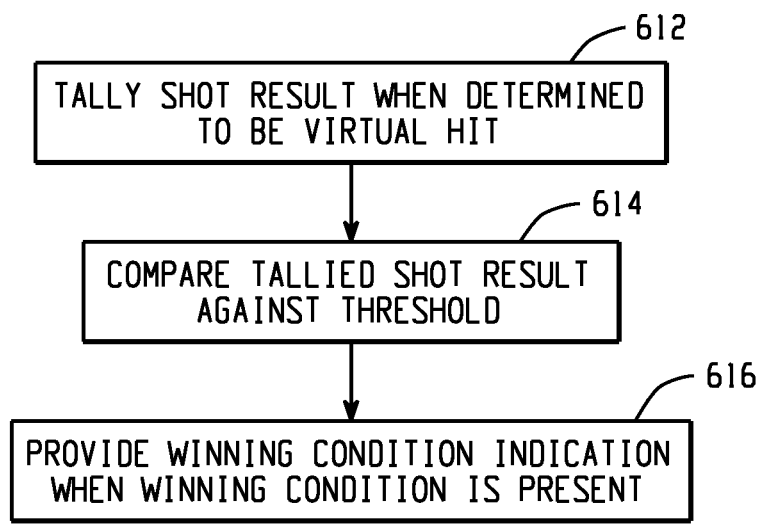
FIG. 4 is a process flow diagram of further steps for the computer implemented interactive vehicle gaming method of FIG. 3 according to one exemplary embodiment.

With reference now to FIG. 3, a computer implemented interactive vehicle gaming method will be described. In particular, the method of FIG. 3 will be described in association with the system 10 shown in FIG. 1 and described hereinabove, though this is not required and the method could be used with other systems and components thereof. As shown, the first and second game devices 12, 14 are first connected at 602. This can include taking advantage of a wireless communication subsystem(s) 524 of device 12 and a corresponding component of device 14 to connect the devices 12, 14 together via the network 16. Connecting the first and second game devices 12, 14 can include receiving a start game command from each of the first and second games devices 12, 14 and at least one of the start commands of the first and second game devices 12, 14 can be received as a voice command 12, 14 (e.g., via the microphone 530).

Next, at 604, at least one game parameter can be determined for the first and second game devices 12, 14 associated with driving behavior for at least one vehicle, such as for the vehicles 18, 20. As will be described in more detail below, the at least one game parameter can closely correspond to speed, turning g-forces, acceleration and/or braking patterns for the vehicle 18 or 20 in which the game device 12 or 14 resides. Accordingly, operation of the vehicle 18, for example, can be accounted for via the various hardware components of the device 12 residing in the vehicle 18. Likewise, operation of the vehicle 20 can be accounted for via the various hardware components of the device 14 residing in the vehicle 20. For example, the motion sensor 510, which can be or include an accelerometer, and the location processor 515 in the device 12 can be used to monitor operation of the vehicle 18.

Once the game devices 12 and 14 are connected, and once at least one gaming parameter for the game devices 12, 14 has been determined, user input can be received on the first interactive game device 12 at 606 to initiate a virtual shot against the second interactive game device 14. This can include receiving a voice command via the microphone 530 and/or receiving touch input on the touch screen 546, for example. After the user input is received, a shot result can be determined in 608 for the virtual shot based on the at least one game parameter. For example, a computer randomizer can be used to determine when a virtual shot results in a direct shot in combination with the at least one game parameter. In particular, the at least one game parameter can be used to increase or decrease the likelihood of the randomizer determining that a shot result for a virtual shot is a hit or not a hit against the second gaming device 14. After determining the shot result, at least one indication of the shot result can be provided at 610 for at least one of the first and second interactive game devices 12, 14. By way of example, both devices 12, 14 can provide visual and/or audio indications for the shot result, including whether the shot result is considered a hit or not a hit.

In one exemplary embodiment, the at least one game parameter can include at least one first device game parameter for the first game device 12 associated with driving behavior for the first vehicle 18, the first vehicle 18 being one of the vehicles 18, 20 in the system 10 and the first game device 12 being located in the first vehicle 18. The at least one game parameter can additional include at least one second device game parameter for the second game device 14, the second game device being located in the second vehicle 20. Accordingly, determining the at least one game parameter in 604 can include determining the at least one first device game parameter and determining the at least one second game device parameter. In addition, determining the at least one game parameter can further include communicating the at least one first game parameter from the first game device 12 to the second game device 14 and communicating the at least one second device game parameter from the second game device 14 to the first game device 12.

In an exemplary embodiment, the at least one first device game parameter can include a target accuracy level for the first game device 14 and determining the shot result can be based on the target accuracy level for the first game device 12. More particularly, the target accuracy level can be determined based on input to the first game device 12 from the motion sensor 510 and the location processor 515 of the first game device 12. Such input can include speed, turning g-forces, acceleration, braking patterns, etc., corresponding to the vehicle 18. More particularly, the target accuracy level can correspond directly to a comparison of the input to predetermined driving metrics so that the target accuracy level is increased when the comparison is favorable and decreased when the comparison is unfavorable. Thus, a likelihood of the shot result being a hit increases when the target accuracy level is increased. In an exemplary embodiment, the predetermined driving metrics are established so that a favorable comparison thereagainst correlates to safe driving of the vehicle 18 and/or fuel efficient driving of the vehicle 18. For example, rapid acceleration and deceleration of the vehicle 18 could be sensed by the first game device 12 through the motion sensor 510 and/or location sensor 515 this could compare unfavorably against the predetermined driving metrics to thereby reduce the target accuracy level.

The at least one second device game parameter can include a stealth factor for the second game device 14. The stealth factor can be communicated from the second game device 14 to the first game device 12, and wherein determining the shot result in 608 is based on the stealth factor for the second game device 14. In one embodiment, the stealth factor is based on the frequency of shots initiated on the second game device 14. This can be over a particular period of time, during a single game against the first game device 12, or some other frequency factor. Thus, in a specific embodiment, the stealth factor can be inversely related to the frequency of shots initiated in that the stealth factor is reduced when the frequency of shots is high and increased when the frequency of shots is low, and further wherein the likelihood of the shot result being a hit increases when the stealth factor for the second game device 14 is reduced.

As already mentioned, receiving the user input in 606 can include receiving a voice command by the first game device 14 to initiate the virtual shot. This would enable the method to be initiated by a driver in the first vehicle 18 without requiring the driver to make visual contact with the first game device 12. In accord, an audio indication can be provided on each of the first and second game devices 12, 14 when the virtual shot is initiated and likewise an additional audio indication can be provided corresponding to the shot result on each of the first and second game devices 12, 14.

While the method illustrated in FIG. 3 only shows a virtual shot being initiated on the first game device 12 against the second game device 14, this arrangement can be applied to both devices 12, 14 and the first of the game devices 12, 14 to reach a predetermined number of hits (i.e., a threshold number of hits) can be declared a winner in a particular game. More particularly, and with additional reference to FIG. 4, the method can additionally include having the shot result tallied in 612 when the shot result is determined to be a virtual hit. The tallied shot results can be compared against a predetermined threshold (e.g., three total shots) in 614 to determine whether a winning condition is present. A winning condition can be determined to be present when the number of virtual hits reaches the predetermined threshold, which can be three hits for example. A winning condition indication can be provided in 616 when the winning condition is present. This can be communicated audibly by the first and second game devices 12, 14. Optionally, visual indications can be provided in addition to (or instead of) audio indications.

By the foregoing, drivers or passengers in the vehicles 18, 20 can virtually take on the role of tank commanders and can be matched to one another to have a virtual battle. In operation, the second vehicle 20 can be any vehicle on the road having a suitable second game device 14 that can be connected to the first game device 12 over the network 16. The game promotes safe and/or fuel efficient driving in that drivers will have their target accuracy level increased when operating the vehicles in a fuel efficient manner and/or a safe manner and decreased when operating the vehicle in a less fuel efficient manner and/or an unsafe manner.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer implemented interactive vehicle gaming method, comprising:
   connecting first and second interactive game devices for communication therebetween, the first interactive game device is a portable device located in a first vehicle and the second interactive game device is a portable device located in a second vehicle, wherein the first and second vehicles are each moving vehicles that are capable of carrying one or more human occupants;
   determining at least one game parameter for the first and second game devices associated with driving behavior for at least one of the first vehicle and the second vehicle, wherein the at least one game parameter includes at least one first device game parameter for the first game device, the at least one first device game parameter is associated with driving behavior for the first vehicle, and the driving behavior for the first vehicle is determined based on input from at least one motion sensor located in the first vehicle,
   wherein determining the at least one first device game parameter includes determining a target accuracy level for the first game device, and the target accuracy level is determined based on a comparison of driving behavior for the first vehicle to a predetermined driving metric, the predetermined driving metric is stored in a memory of the first game device;
   receiving user input on the first game device to initiate a virtual shot against the second game device;
   after receiving the user input, determining a shot result for the virtual shot against the second game device based on the at least one game parameter, wherein determining the shot result for the virtual shot against the second game device is based on the target accuracy level for the first game device; and
   providing at least one indication of the shot result for at least one of the first and second game devices.

2. The method of claim 1 wherein the at least one game parameter includes:
   at least one second device game parameter for the second game device,
   wherein determining at least one game parameter includes determining the at least one first device game parameter and determining the at least one second device game parameter.

3. The method of claim 2 wherein determining the at least one game parameter further includes communicating the at least one second device game parameter from the second game device to the first game device.

4. The method of claim 1 wherein the target accuracy level is determined based on input from an accelerometer and a motion manager of the first game device.

5. The method of claim 4 wherein the input includes speed, turning G forces, acceleration and braking patterns.

6. The method of claim 5 wherein the at least one second device game parameter includes a stealth factor for the second game device, and wherein the stealth factor is communicated from the second game device to the first game device, and wherein determining the shot result is based on the stealth factor for the second game device.

7. The method of claim 6 wherein the stealth factor is based on the frequency of shots initiated on the second game device, and wherein the stealth factor is inversely related to the frequency of shots initiated in that the stealth factor is reduced when the frequency of shots is high and is increased when the frequency of shots is low, and wherein a likelihood of the shot result being a hit increases when the stealth factor is reduced.

8. The method of claim 2 wherein the at least one second device game parameter includes a stealth factor for the second game device, and wherein the stealth factor is communicated from the second game device to the first game device, and wherein determining the shot result is based on the stealth factor for the second game device.

9. A computer implemented interactive vehicle gaming method, comprising:
   connecting first and second interactive game devices for communication therebetween;
   determining at least one game parameter for the first and second game devices associated with driving behavior for at least one vehicle;
   receiving user input on the first device to initiate a virtual shot against the second game device;
   after receiving the user input, determining a shot result for the virtual shot based on the least one game parameter; and
   providing at least one indication of the shot result for at least one of the first and second game devices,
   wherein the at least one game parameter includes:
      at least one first device game parameter for the first game device associated with driving behavior for a first vehicle of the at least one vehicle, the first game device located in the first vehicle; and
      at least one second device game parameter for the second game device, the second game device located in a second vehicle of the at least one vehicle, and
   wherein determining at least one game parameter includes determining the at least one first device game parameter and determining the at least one second device game parameter,
   wherein the at least one first device game parameter includes a target accuracy level for the first game device and determining the shot result is based on the target accuracy level for the first game device, wherein the target accuracy level is determined based on input from an accelerometer and a motion manager of the first game device and the target accuracy level corresponds directly to a comparison of the input to desired driving metrics so that the target accuracy level is increased when the comparison is favorable and is decreased when the comparison in unfavorable, and wherein a likelihood of the shot result being a hit increases when the target accuracy level is increased,
   wherein the at least one second device game parameter includes a stealth factor for the second game device, and wherein the stealth factor is communicated from the second game device to the first game device, and wherein determining the shot result is based on the stealth factor for the second game device, and
   wherein the stealth factor is based on the frequency of shots initiated on the second game device.

10. The method of claim 7 wherein the stealth factor is inversely related to the frequency of shots initiated in that the stealth factor is reduced when the frequency of shots is high and is increased when the frequency of shots is low, and wherein a likelihood of the shot result being a hit increases when the stealth factor is reduced.

11. The method of claim 1 wherein receiving the user input includes receiving a voice command by the first game device to initiate the virtual shot.

12. The method of claim 1 further including:
   providing an audio indication on each of the first and second game devices when the virtual shot is initiated.

13. The method of claim 1 wherein providing at least one indication of the shot result includes:
   providing an audio indication corresponding to the shot result on each of the first and second game devices.

14. The method of claim 1 wherein connecting the first and second game devices includes:
   receiving a start game command from each of the first and second game devices, and wherein at least one of the start commands from the first and second game devices is received as a voice command.

15. The method of claim 1 further including:
   tallying the shot result when the shot result is determined to be a virtual hit;
   comparing the tallied shot results against a predetermined threshold to determine whether a winning condition is present; and
   providing a winning condition indication when the winning condition is present.

16. An interactive vehicle gaming system, comprising:
   a first interactive game device located in a first vehicle that is a moving vehicle that is capable of carrying one or more human occupants;
   a second interactive game device located in a second vehicle that is a moving vehicle that is capable of carrying one or more human occupants, the first game device connected to the second game device for communication therebetween, the first game device including a processor and a memory coupled to the processor and operable for storing instructions, which, when executed by the processor, cause the processor to perform operations including:
      determining at least one game parameter for the first and second game devices associated with driving behavior for at least one vehicle, wherein the at least one game parameter includes:
         at least one first device game parameter for the first game device associated with driving behavior for the first vehicle, and wherein the at least one first device game parameter includes a target accuracy level for the first game device; and
         at least one second device game parameter for the second game device, and wherein the at least one second device game parameter includes a stealth factor for the second game device, and wherein the stealth factor is communicated from the second game device to the first game device,
      wherein determining the at least one game parameter includes determining the at least one first device game parameter and determining the at least one second device game parameter;

determining a shot result for a virtual shot based on the at least one game parameter after receiving user input on the first game device to initiate the virtual shot against the second game device; and providing at least one indication of the shot result for the at least one of the first and second game devices.

17. The system of claim 16 wherein determining the shot result is based on the target accuracy level for the first game device and the stealth factor for the second game device.

18. The system of claim 17 wherein the first game device includes an accelerometer and a motion manager, and wherein the target accuracy level is determined based on input from the accelerometer and the motion manager, and further wherein the input includes speed, turning G forces, acceleration and braking patterns.

19. The system of claim 16 wherein each of the first and second game devices are portable devices.

* * * * *